US012008890B2

(12) United States Patent
Piccolo, III

(10) Patent No.: US 12,008,890 B2
(45) Date of Patent: Jun. 11, 2024

(54) FIRE ALARM SPEAKER CIRCUITS FOR DUAL-PURPOSE SPACES

(71) Applicant: Tyco Fire & Security GmbH, Neuhausen am Rheinfall (CH)

(72) Inventor: Joseph Piccolo, III, Fitzwilliam, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/971,493

(22) Filed: Oct. 21, 2022

(65) Prior Publication Data

US 2023/0129804 A1 Apr. 27, 2023

Related U.S. Application Data

(60) Provisional application No. 63/270,972, filed on Oct. 22, 2021.

(51) Int. Cl.

| | |
|---|---|
| ***G08B 3/10*** | (2006.01) |
| ***G08B 17/00*** | (2006.01) |
| ***H04R 3/12*** | (2006.01) |
| ***H04R 27/00*** | (2006.01) |

(52) U.S. Cl.

CPC ............... *G08B 3/10* (2013.01); *G08B 17/00* (2013.01); *H04R 3/12* (2013.01); *H04R 27/00* (2013.01); *H04R 2227/003* (2013.01); *H04R 2227/005* (2013.01)

(58) Field of Classification Search

CPC . G08B 3/10; G08B 17/00; H04R 3/12; H04R 27/00; H04R 2227/003; H04R 2227/005

See application file for complete search history.

(56) References Cited

U.S. PATENT DOCUMENTS

| | | | | |
|---|---|---|---|---|
| 10,021,748 B2 * | 7/2018 | Tan | G08B 17/00 | |
| 2012/0154160 A1 * | 6/2012 | Piccolo, III | G08B 27/00 | 340/628 |
| 2014/0184410 A1 * | 7/2014 | Feng | G08B 17/00 | 340/540 |
| 2016/0007179 A1 * | 1/2016 | Kim | G08B 7/066 | 455/404.1 |
| 2020/0364991 A1 * | 11/2020 | Scalisi | G08B 13/19619 | |
| 2021/0066960 A1 * | 3/2021 | Kriete | G08B 25/04 | |
| 2022/0068115 A1 * | 3/2022 | Iasso | G08B 25/06 | |

* cited by examiner

*Primary Examiner* — Mohamed Barakat

(74) *Attorney, Agent, or Firm* — ArentFox Schiff LLP

(57) ABSTRACT

A method for selectively transmitting audio signals in a fire alarm system includes receiving, by a Notification Appliance Circuit (NAC) selecting device, an audio signal for transmission over a first NAC or a second NAC. Each of the first NAC and the second NAC includes respective groupings of one or more NAC appliances. The NAC selecting device receives a selection signal from a Fire Alarm Control Panel (FACP) electronically connected to the NAC selecting device. The selection signal identifies one or more NAC appliances that should be moved from a first grouping corresponding to the first NAC to a second grouping corresponding to the second NAC. The NAC selecting device selectively transmits the audio signal to one of the first NAC and the second NAC based on the selection signal.

18 Claims, 3 Drawing Sheets

FIRE ALARM SPEAKER CIRCUITS FOR DUAL-PURPOSE SPACES

CLAIM OF PRIORITY

The present application claims priority to U.S. Provisional Application No. 63/270,972 filed Oct. 22, 2021, which is assigned to the assignee hereof and incorporated by reference herein.

FIELD

The present disclosure relates generally to fire-alarms. More particularly, the present disclosure relates to fire alarm speaker circuits for dual-purpose spaces.

BACKGROUND

In alarm systems, such as building fire alarm systems, it is desirable to have audio capabilities. Audio capabilities enable audible annunciation messages to be played when mass notification is required. As audio capabilities in the form of mass notification systems have been integrated with traditional building fire alarm systems, a need has arisen for making easier to selections from multiple fire alarm messages, operator-initiated messages, and mass notification messages and apply these messages to the appropriate users and notification zones. Fire alarm systems typically use speakers for voice evacuation and building messaging.

Rooms or spaces of a building are typically placed in groups called notification/paging zones. The speakers in a specific zone are typically coupled with a circuit that provides the audio signal and power to drive one or more speakers for that zone (all speakers play the same audio as they are all on the same circuit). However, some buildings change the notification zoning of the building ad hoc based on building usage. For example, there may be classrooms in a school building that make up multiple virtual “schools” within a single physical building. When virtual “schools” set up is used, some classrooms may “belong” to a middle school virtual building in the morning and may belong to a virtual high school in the afternoon. Typical fire alarm circuit installation in large school building would only require two fire alarm circuits: one circuit for the middle school and one circuit for the high school. However, in the aforementioned case, the rooms that “belong” to both schools and are switched depending on the time of day cannot be directly coupled with either fire alarm circuit since the messages they should play change based on the time of day as well. One potential solution involves the installation of additional circuits to the speakers coupled with the circuits so that messaging to individual speakers can be controlled independently. However, such additional circuits increase the cost of the fire alarm system installation considerably.

Therefore, there is a need in the art to improve fire alarm speaker circuits for dual purpose spaces.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example method for selectively transmitting audio signals in a fire alarm system includes receiving, by a Notification Appliance Circuit (NAC) selecting device, an audio signal for transmission over a first NAC or a second NAC. Each of the first NAC and the second NAC includes respective groupings of one or more NAC appliances. The NAC selecting device receives a selection signal from a Fire Alarm Control Panel (FACP) electronically connected to the NAC selecting device. The selection signal identifies one or more NAC appliances that should be moved from a first grouping corresponding to the first NAC to a second grouping corresponding to the second NAC. The NAC selecting device selectively transmits the audio signal to one of the first NAC and the second NAC based on the selection signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

For example, in one implementation, which should not be construed as limiting, a loop-powered NAC selector may be coupled with a Signal Line Circuit (SLC), such as circuits used for addressable initiating devices or addressable notification. A notification may be intended for delivery to multiple fire alarm speakers associated with notification/paging zones. It should be noted that each notification/paging zone may play an audio message from only one source. In an aspect, the NAC selector on the SLC may be configured to select one of 2 (or more) speaker NAC circuits for driving one or more speakers.

One of the many sources of costs in fire safety systems is the wiring and material costs associated with the notification appliances. Building safety codes define the specification for notification appliance wiring, voltage and current. For example, according to building safety codes, notification appliances are intended to operate from a nominal 24 volt signal which provides the power for the notification appliance to perform its notification function. For example, an alarm bell, a strobe light, or an electronic audible alarm device operates from a nominal 24 volt supply. In general, however, notification devices are required to operate at voltages as low as 16 volts.

Generally, fire alarm circuits should meet the existing fire code requirements and may be coupled with fault tolerant hazardous power control system. According to aspects of the present disclosure, the FACP electronically coupled with the SLC loop communication may control the selection of a particular NAC based on selected time intervals or based on a user input (for example, using the interface of the FACP). Advantageously, after the NAC selecting device selects a particular NAC, audio signals may then be provided for one or more notification appliances/speakers coupled with the NAC selecting device as if the one or more notification appliances/speakers coupled with the NAC selecting device are directly coupled with the selected NAC. The NAC selecting device may be designed to operate as a circuit selector for both conventional and addressable speaker devices. In an aspect, one NAC selecting device may be provided to route the selected audio messages to notification areas that may all serve a first purpose at one time and a second purpose at another time.

An example of fire alarm speaker circuit for dual purpose spaces is described below. Thus, the present disclosure provides a method for selectively transmitting audio signals in a fire alarm system using a NAC selecting device.

Figure 1:
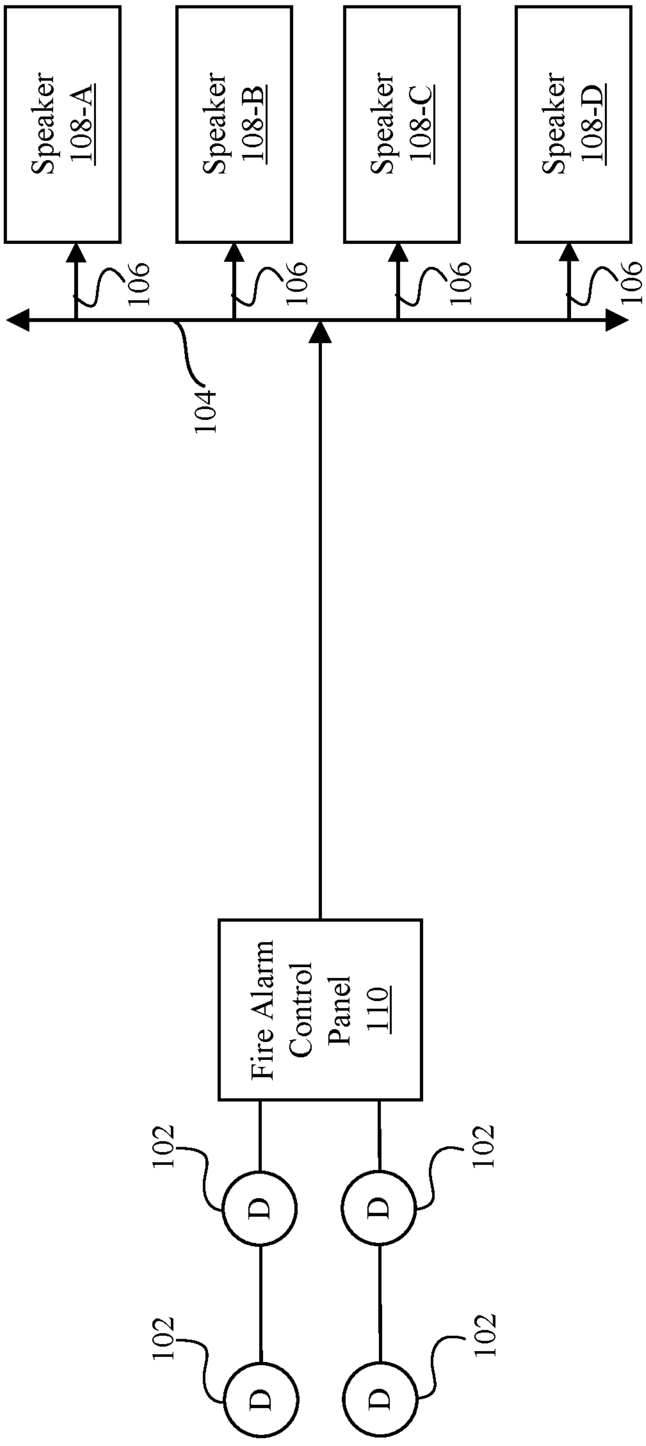
FIG. 1 is a block diagram illustrating the details of an example fire alarm system provided in accordance with aspects of the present disclosure.

FIG. 1 is a block diagram illustrating the details of a fire alarm system 100 provided according to an aspect of the present disclosure. The block diagram is shown comprising fire alarm control panel (FACP) 110, detectors (and/or initiation devices) 102, and speakers (and/or notification appliances) 108.

Though not illustrated in FIG. 1, broadly, detectors 102 (e.g., smoke detector, heat detector, gas detector, water detector) may be placed in different locations where it is desirable to detect a hazardous event. Speaker units 108 may be placed in locations where it would be desirable to play one or more audio messages, such as a voice warning messages and/or instructions and/or alarm sounds (e.g., horn). Control modules and audio transponders may be placed close to corresponding speaker units 108. In general, FACP 110 refers to a device at which the communication paths from various detectors 102 terminate. FACP 110 may activate speaker units 108 to play the audio messages in response to receiving the appropriate alarms.

Each detector 102 may be configured to detect a hazardous situation (or any undesirable situation for which the detector is designed) in the surrounding area, and may send an alarm signal if/when such a situation is detected/suspected. In general, each detector 102 may have a unique identifier based on detector's specific location, and the hazardous situation may be determined at the FACP 110 based on the type of detector 102 that sent an alarm signal. The detectors 102 may be coupled with a corresponding FACP 110 by a loop structure (using protocols such as ARCnet, or any other similar protocol).

Speakers 108 are coupled with network 104, and may be individually addressable according to the network protocol used on the network. In an aspect, each speaker 108 may be addressable using a particular protocol. Each speaker 108 may receive an audio message (e.g., "live message") to be played using a particular circuit, such as NAC and may play the corresponding message. Each speaker 108 may further receive control messages, which may indicate operations such as increasing the volume, playing a pre-stored message, and the like. Alternatively, or in addition, each speaker 108 may receive one or more other alarm messages and correspondingly may generate alarm sounds (e.g., horns, beeps). In some cases, an alarm message may include an audio message.

FACP 110 may receive various alarms from detectors 102, and may provide a suitable interface for an operator to view the corresponding information. In addition, the FACP 110 may enable an operator to specify custom messages (either pre-stored or by capturing live voice) to be played on each speaker 108. FACP 110 may include a system controller, a NAC controller, and an initiating device circuit (IDC) controller. The IDC controller may monitor an IDC that includes one or more detectors 102 (such as smoke detectors, pull stations, etc.) The IDC controller may send a communication to the system controller regarding one, some, or all of the detectors 102 (such as a communication that a smoke detector has detected smoke). The system controller may communicate with the NAC controller in order to activate one or more of the notification appliances 108 in the NAC.

As each speaker 108 may be individually addressable, different messages may be sent to different speakers 108. In addition, an operator may dynamically (in real-time or impromptu) generate messages, which may be played on any one or any selected combination of the speaker 108, e.g., any speakers 108 located in an area where the message is applicable. The description is continued with reference to the details of a fire alarm speaker circuit for dual purpose spaces.

Figure 2:
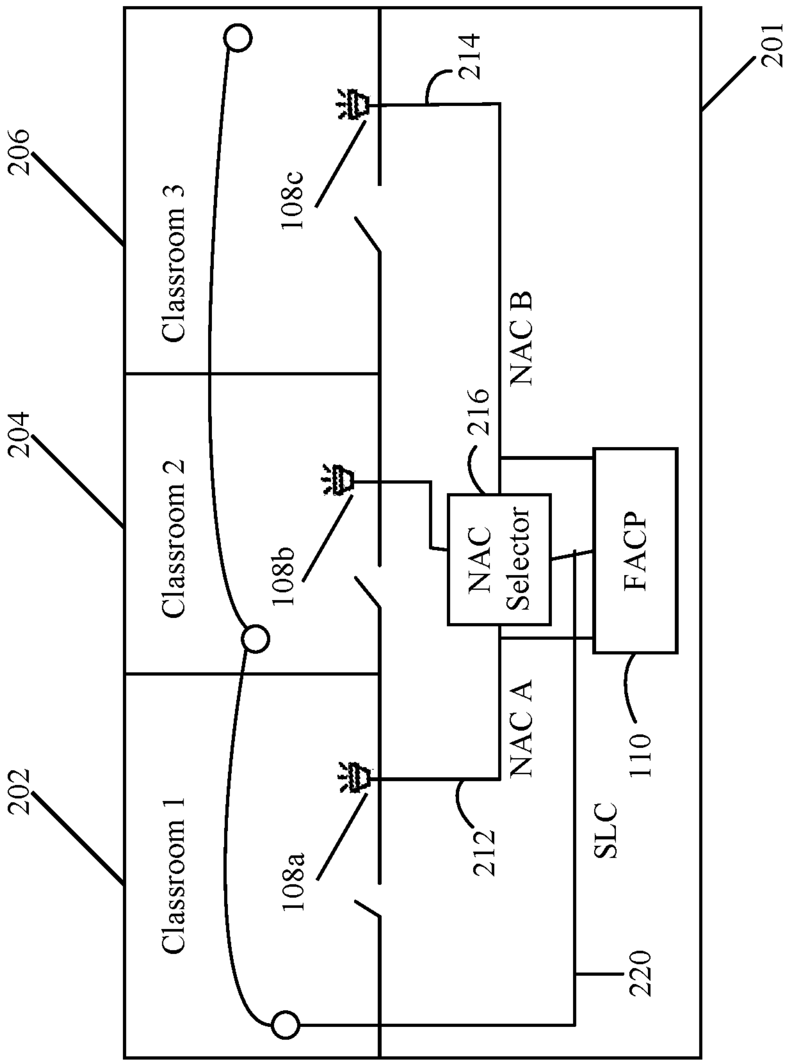
FIG. 2 is a circuit diagram of an example fire alarm speaker circuit for dual purpose spaces provided in accordance with aspects of the present disclosure.

FIG. 2 is a circuit diagram of an example fire alarm speaker circuit for dual purpose spaces provided in accordance with aspects of the present disclosure. In the simplified example shown in FIG. 2, a building may include three different classrooms that belong to different notification zones—a first classroom 202, a second classroom 204 and a third classroom 206. Typically, needs of the school may change, depending on the year or specific time of the year or even specific time of the day. In this example, the first classroom 202 (located in the first notification zone) may be assigned to a middle school and the third classroom 206 (located in the second notification zone) may be assigned to a high school. The second classroom 204 is discussed below.

Notification appliances are typically connected in parallel in what is known as a notification appliance circuit or NAC. Each NAC may be coupled with a power source, such as a 24 volt source, and may include a positive conductor, a ground conductor, and one or more notification appliances connected across the two conductors. The power source may be disposed in the FACP 110 or other panel. The positive and ground NAC conductors may serve to deliver the operating voltage from the power source, to the distributed notification appliances. In FIG. 2, a first NAC 212 may be used for the first notification zone 202 (middle school announcements) and a second NAC 214 may be used for the third notification zone 206 (high school announcements). The audio signal (e.g., announcements) for the first NAC 212 and the second NAC 214 may be generated by the FACP 110 or by another source and routed through the FACP 110.

In one example, the NAC appliances 108 are not individually addressable, and may receive a command to activate all of the NAC appliances 108 at once. As another example, the NAC appliances 108 may be individually addressable and may be activated individually so that one, some, or all of the NAC appliances 108 are activated to broadcast an audio message.

The second classroom 204 may float between the middle school (the first notification zone) and the high school (the second notification zone). For example, the second classroom 204 may be associated with the middle school in the morning, but at a specific time in the afternoon (for example, after 3:00 PM) the second classroom 204 may become associated with the high school. While it is possible to have a separate circuit for the second classroom 204 that may independently move the second classroom 204 back and forth between the first notification zone circuit and the second notification zone circuit, such solution would increase installation costs of the fire system 100. For example, since many speakers used in fire alarm systems typically use amplifiers, having additional circuits would also require additional devices, like amplifiers. Furthermore, such solution reduces flexibility, since at some point in time another classroom, for example the first classroom 202, may become the floating room instead of the second classroom 204.

According to aspects of the present disclosure, a NAC selector 216 may be electronically coupled with both the first NAC 212 and the second NAC 214 via corresponding input ports and may be controlled by the FACP 110 via a selection input port electronically coupled with the SLC 220. In some configurations, the SLC 220 can be, but need not be, IDNet wiring, which is a simplex proprietary wired communication channel. Other types of wired networks may also be used instead.

In an aspect, the NAC selector 216 may be configured to select either the first NAC 212 or the second NAC 214 based on a selection signal sent by the FACP 110 and indicative of the current usage of the second classroom 204. In an aspect, the selection signal may indicate addresses and/or identifiers of one or more NAC appliances 108 and the desired NAC circuit (or grouping of NAC appliances corresponding to respective NAC circuits) the identified NAC appliances 108 should be switched to. Advantageously, the selection signal may be generated by the FACP 110 in response to a user input and/or may be generated by the FACP 110 automatically based on a predefined schedule. For example, the FACP 110 may be programmed to send every day a selection signal to the NAC selector 216 at a specific time of day (for example, at 3 PM) based on a predetermined schedule to switch a particular room, such as the second classroom 204, from the first NAC 212 to the second NAC 214. It should be noted that the FACP 110 may be programmed to send another selection signal to the NAC selector 216 at different time of the day or the following day to switch the second classroom 204 back from the second NAC 214 to the first NAC 212.

In an alternative implementation, the user interface of the FACP 110 may present to an operator one or more virtual buttons on a display of the FACP 110 that may facilitate the switch of certain rooms (i.e., one or more speakers) from one circuit to another. For example, the FACP 110 may be configured to send a selection signal to the NAC selector 216, in response to an operator pressing the aforementioned virtual button. It should be noted that in various aspects the user interface of the FACP 210 may include other buttons, sliders, knobs, a touch screen, or any other form of interface that allows user commands to be provided to the NAC selector 216. In addition, the user interface may include any form of audio and/or visual outputs for receipt by a user of the FACP 110. Example audio and/or visual outputs may include, but are not limited to, light emitting diodes ("LEDs"), meters, displays, such as liquid crystal displays ("LCDs"), or any other mechanisms providing indication to a user of the condition and/or operation of the NAC selector 216. In an aspect, an internal timer coupled with the processor of the FACP 110 may be used to control the NAC selector 216 as described herein. In an aspect, the timer can be positioned within the processor of the FACP 110. In an aspect, the desired audio message (either from the first NAC 212 or the second NAC 214) may then be routed through the NAC Selector 216 to the speaker **108*b* in the second classroom 204**.

FIG. 2 is merely for illustration purposes. In more sophisticated form of a fire alarm system fewer or greater notification appliances (e.g., strobes, horns, sirens, etc.), as well as multiple speakers per classroom may be used, fewer or greater initiating devices (e.g., smoke detectors, CO detectors, pull stations, etc.) may be used, and multiple NACs may be used. It would be understood by one of ordinary skill in the art that the NAC selector 216 is not limited to selecting between just two input NAC circuits. For example, if the second classroom 204 is also used as a grammar school room (in addition to middle and high schools), in an aspect of the present disclosure, the NAC selector 216 may be configured to select one out of three NACs.

Since a large physical building may comprise several virtual buildings served by several speaker circuits, the wiring needed is often difficult and costly to install and maintain. Advantageously, various aspects of the disclosure may reduce the cost of installation wiring, equipment, and labor needed to support operation of dual-purpose spaces. Typically, in a multiple virtual building system a single NAC selector 216 may be needed for each group of speakers in one unit that may need to be switched from one virtual building to another.

Furthermore, fire alarm systems, such as the fire alarm system 100 shown in FIG. 1, generally requires a certain type of supervision of wiring. An alarm circuit to be supervised is generally a closed circuit energized by a relatively low current for checking integrity of the circuit. The detection of an alarm condition increases the current in the alarm circuit materially by shunting a series resistor, and such increase either operates an audible alarm directly, or actuates a switching device such as a relay, which in turn operates the alarm. It is desirable to continuously check the integrity of the fire alarm circuit, including all of the elements required to be actuated in response to the detection of a condition for which an alarm should be given. Typically, each speaker monitors if it has a connection to the circuit the respective speaker is coupled with, but not to any other circuits in the system.

In an aspect, the NAC selector 216 may be configured to behave functionally as a set of relays controlled by the SLC 220, such as, but not limited to IDNET™ or IDNAC™ with an end-of-line (EOL) resistor placed on the unselected NAC circuit. In one implementation, the NAC selector 216 may be configured to communicate supervision status of the downstream speakers 108 to the FACP 110 via the SLC 220 or may be configured to simulate a mirror line fault on the appropriate speaker NAC. In other words, the NAC selector 216 may be configured to perform circuit switching as described above. In addition, the NAC selector 216 may be configured to check the integrity of the circuit. For example, the NAC selector 216 may monitor wires connecting an amplifier to the NAC selector 216 and the wire connecting the NAC selector 216 to an individual speaker 108 may be monitored by the speaker 108. Advantageously, the disclosed NAC selector 216 simplifies the installation procedure by enabling an installer to run the two circuits (for example, where each circuit connects all rooms in a particular virtual school) and may use T-tap end connectors on each of the circuits to connect the respective circuits to corresponding set of speakers 108, without needing any additional wiring between the FACP 110 and the speakers 108.

As noted above, the notification appliance 108 may include an addressable speaker. Unlike non-addressable notification appliances (which are activated by modifying the power to the NAC to which they are connected), addressable notification appliances need not be grouped based on wiring. Instead, the group(s) to which each addressable notification appliance is to be assigned be manually designated so that the FACP 110 can simultaneously turn a group of addressable notification appliances on/off at the proper times. Such a grouping is called a virtual NAC ("VNAC"), with each of the addressable notification appliances in the VNAC being "turned on" by the FACP 110.

The addressable speaker may connect to and receive messages over the pair of power lines and may have plural taps for selecting audio power. The addressable speakers may provide multiple sets of taps (not shown), one for each voltage. If the fire alarm system 100 includes addressable speakers 108, simply enabling the first NAC 212 or the second NAC 214 to pass through the NAC Selector 216 would be sufficient (i.e., relay model). If the fire alarm system 100 includes conventional speakers, the aforementioned relay model implementation of the NAC Selector 216 should work as well. However, it should be noted that the relay model implementation would greatly limit usage to essentially having only one speaker device 108 per NAC. In some aspects, the relay model implementation of the NAC selector 216 may be sufficient since the switched speakers 108 (such as speakers **108*b* located in the second classroom 204**) that are generally located in the same area of the building may be placed at the end of the circuits that are being switched.

Figure 3:
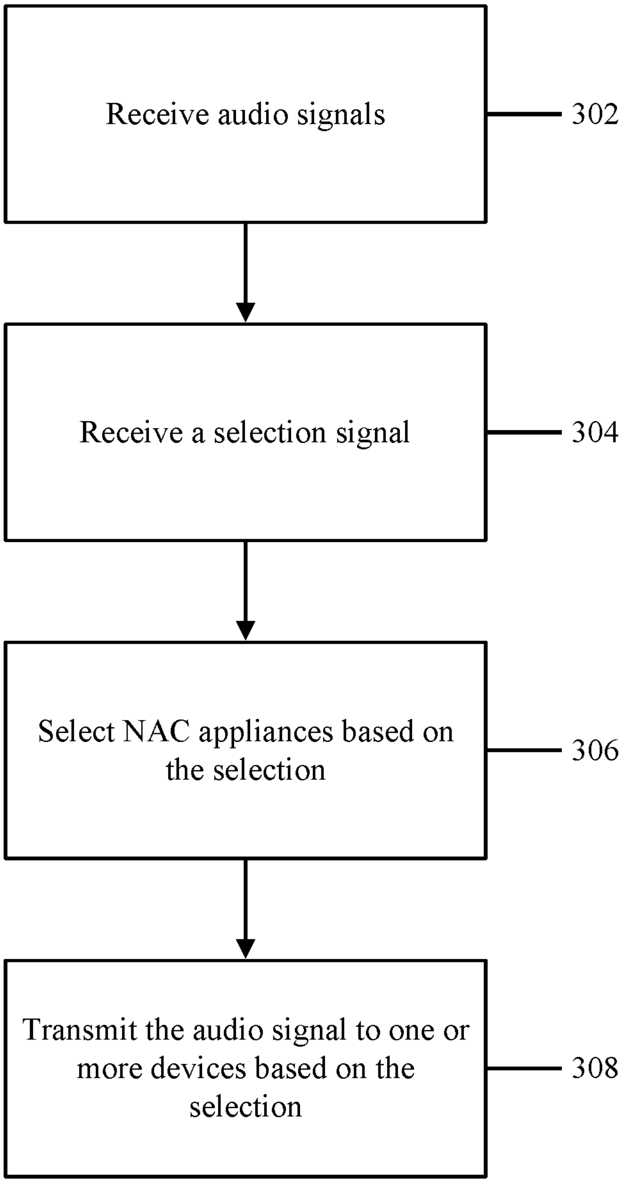
FIG. 3 is a flowchart of an example method for selectively transmitting an audio signal in a fire alarm system, in accordance with some aspects of the present disclosure.

FIG. 3 is a flowchart of an example method for transmitting an audio signal to a fire alarm speaker, in accordance with some aspects of the present disclosure.

At 302, the NAC selector 216 may receive an audio signal via one of the input ports. In an aspect, the audio signal may represent an audio message or announcement that should be played on the first NAC 212 or on the second NAC 214. The audio signal (e.g., announcements) for the first NAC 212 and/or the second NAC 214 may be generated by the FACP 110 or by another source and routed through the FACP 110. In one example, the NAC appliances 108 are not individually addressable, and receive a command to activate all of the NAC appliances 108 at once. As another example, the NAC appliances 108 may be individually addressable and may be activated individually so that one, some, or all of the NAC appliances 108 are activated.

At 304, the NAC selector 216 may receive a selection signal from the FACP 110 using a selection port. Advantageously, the selection signal may be generated by the FACP 110 in response to a user input and/or may be generated by the FACP 110 automatically based on a predefined schedule. For example, the FACP 110 may be programmed to send a selection signal to the NAC selector 216 at a specific time of day (for example, at 3 PM) based on a predetermined schedule to switch a particular room, such as the second classroom 204, from the first NAC 212 to the second NAC 214. In an alternative implementation, user interface of the FACP 110 may present one or more interface elements (e.g., virtual buttons) to an operator that may be configured to send a selection signal responsive to operator's interactions with the user interface. In an aspect, the selection signal may indicate addresses and/or identifiers of one or more NAC appliances 108 and the desired NAC circuit (or grouping of NAC appliances corresponding to respective NAC circuits) the identified NAC appliances 108 should be switched to.

At 306, the NAC selector 216 may select NAC appliances 108 (i.e., speakers 108) that correspond to respective NAC circuits based on the received selection signal. In other words, the NAC selector 216 may be configured to "transfer" one or more NAC appliances 108 from one of the NAC circuits to another. For example, the NAC selector 216 may be configured to select either the first NAC 212 or the second NAC 214 based on a selection signal sent by the FACP 110 for the one or more NAC appliances 108 (such as NAC appliance **108*b*) identified in the selection signal received at 304**.

At 308, the NAC selector 216 may transmit the received audio signal based on the selection made at step 306. For example, the NAC selector 216 may send the audio signal (i.e., a high school announcement or pre-recorded message) to the second NAC circuit 214 that will include one or more speakers corresponding to the second classroom 204 (e.g. speaker **108*b***).

In other words, a method for selectively transmitting audio signals in a fire alarm system includes receiving, by a Notification Appliance Circuit (NAC) selecting device, an audio signal for transmission over a first NAC or a second NAC. Each of the first NAC and the second NAC includes respective groupings of one or more NAC appliances. The NAC selecting device receives a selection signal from a Fire Alarm Control Panel (FACP) electronically connected to the NAC selecting device. The selection signal identifies one or more NAC appliances that should be moved from a first grouping corresponding to the first NAC to a second grouping corresponding to the second NAC. The NAC selecting device selectively transmits the audio signal to one of the first NAC and the second NAC based on the selection signal.

In an alternative or additional aspect, the selection signal is generated by the FACP based on a predetermined schedule.

In an alternative or additional aspect, the one or more identified NAC appliances are physically located in a notification zone serving a dual purpose.

In an alternative or additional aspect, the selection signal is generated by the FACP based on a user input received via a user interface of the FACP.

In an alternative or additional aspect, the NAC selecting device monitors integrity of the first NAC and the second NAC.

In an alternative or additional aspect, the NAC selecting device transmits supervision status of the first grouping of the one or more NAC appliances and the second grouping of the one or more NAC appliances to the FACP by the NAC selecting device.

In an alternative or additional aspect, the one or more NAC appliances include individually addressable speaker devices.

In an alternative or additional aspect, the NAC selecting device is electrically coupled with the FACP using a Signal Line Circuit(SLC).

In an alternative or additional aspect, the corresponding audio signal comprises one of: a prerecorded announcement message or a live announcement message.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A Notification Appliance Circuit (NAC) selecting device in a fire alarm system, comprising:

at least two input ports electrically coupled with at least two NACs, wherein each of the at least two NACs includes respective groupings of one or more NAC appliances and wherein each of the two or more NACs is configured to transmit a corresponding audio signal received from a Fire Alarm Control Panel (FACP);

a selection input port electrically coupled with the FACP for receiving a selection signal, wherein the selection signal identifies one or more NAC appliances from the at least two NACs that should be moved from a first grouping corresponding to one of the at least two NACs to a second grouping corresponding to a different one of the at least two NACs; and an output port electrically coupled with the at least two NACs configured to transmit the corresponding audio signal based on the selection signal received from the FACP.

2. The NAC selecting device of claim 1, wherein the selection signal is generated by the FACP based on a predetermined schedule.

3. The NAC selecting device of claim 1, wherein the one or more identified NAC appliances are physically located in a notification zone serving a dual purpose.

4. The NAC selecting device of claim 1, wherein the selection signal is generated by the FACP based on a user input received via a user interface of the FACP.

5. The NAC selecting device of claim 1, wherein the NAC selecting device is configured to monitor integrity of the at least two NACs.

6. The NAC selecting device of claim 5, further comprising an output port electronically coupled with the FACP configured to transmit supervision status of the groupings of one or more NAC appliances corresponding to the at least two NACs.

7. The NAC selecting device of claim 1, wherein the one or more NAC appliances comprise individually addressable speaker devices.

8. The NAC selecting device of claim 1, wherein the NAC selecting device is electrically coupled with the FACP using a Signal Line Circuit(SLC).

9. The NAC selecting device of claim 1, wherein the corresponding audio signal comprises one of: a prerecorded announcement message or a live announcement message.

10. A method for selectively transmitting audio signals in a fire alarm system, the method comprising:

receiving, by a Notification Appliance Circuit (NAC) selecting device, an audio signal for transmission over a first NAC or a second NAC, wherein each of the first NAC and the second NAC includes respective groupings of one or more NAC appliances;

receiving, by the NAC selecting device, a selection signal from a Fire Alarm Control Panel (FACP) electronically coupled with the NAC selecting device, wherein the selection signal identifies one or more NAC appliances that should be moved from a first grouping corresponding to the first NAC to a second grouping corresponding to the second NAC; and selectively transmitting, by the NAC selecting device, the audio signal to one of the first NAC and the second NAC based on the selection signal.

11. The method claim 10, wherein the selection signal is generated by the FACP based on a predetermined schedule.

12. The method of claim 10, the one or more identified NAC appliances are physically located in a notification zone serving a dual purpose.

13. The method of claim 10, wherein the selection signal is generated by the FACP based on a user input received via a user interface of the FACP.

14. The method of claim 10, further comprising monitoring integrity of the first NAC and the second NAC by the NAC selecting device.

15. The method of claim 14, further comprising transmitting supervision status of the first grouping of the one or more NAC appliances and the second grouping of the one or more NAC appliances to the FACP by the NAC selecting device.

16. The method of claim 10, wherein the one or more NAC appliances comprise individually addressable speaker devices.

17. The method of claim 10, wherein the NAC selecting device is electrically coupled with the FACP using a Signal Line Circuit(SLC).

18. The method of claim 10, wherein the corresponding audio signal comprises one of: a prerecorded announcement message or a live announcement message.

* * * * *